Aug. 1, 1939.  E. W. MISHLER  2,167,767
ELECTRODE SCRAPING AND DRESSING APPARATUS FOR WELDING MACHINES
Filed Dec. 30, 1937
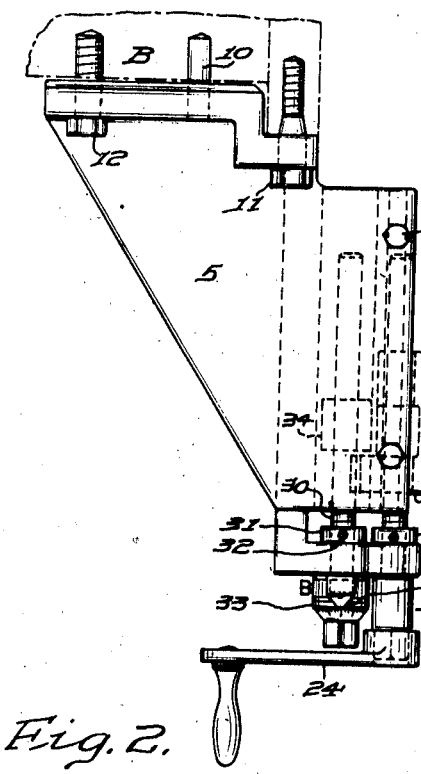
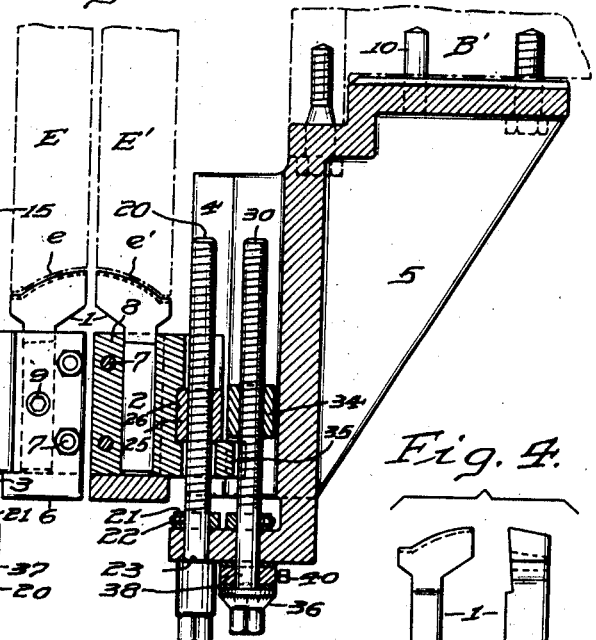
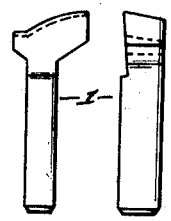
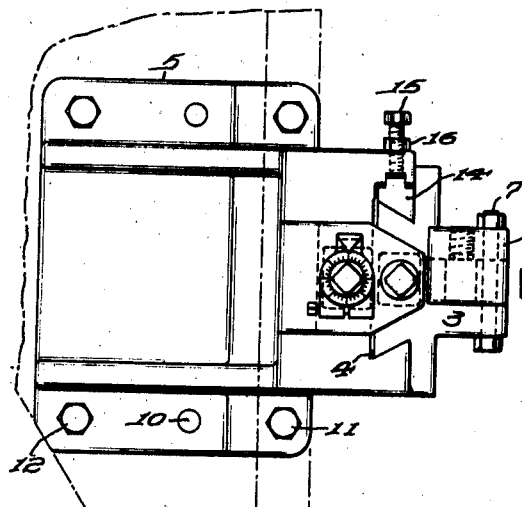
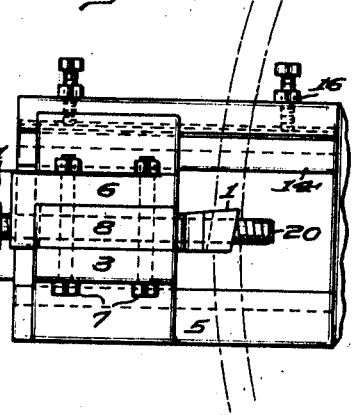
INVENTOR
Earnest W. Mishler.
BY *George K. Helbig*
ATTORNEY
WITNESS
*F. J. Haitman*

Patented Aug. 1, 1939

2,167,767

UNITED STATES PATENT OFFICE 2,167,767

ELECTRODE SCRAPING AND DRESSING APPARATUS FOR WELDING MACHINES

Earnest W. Mishler, Youngstown, Ohio, assignor to The Youngstown Sheet and Tube Company, Youngstown, Ohio, a corporation of Ohio Application December 30, 1937, Serial No. 182,404

6 Claims. (Cl. 82—4)

This invention relates to electric welding machines particularly those comprising electrodes for conducting the welding current through the parts to be welded and is directed especially to mechanism adapted for association and combination with such electrodes to maintain their work-contacting surfaces in proper condition for effective performance of this function.

Welding machines adapted for resistance welding of pipes and other tubular articles have electrodes whose peripheral surfaces engage the walls of the blanks, being shaped to generally conform thereto, and unless they make substantially perfect electrical contact therewith the heavy welding current sometimes causes burning or pitting in the work adjacent the welded seam and in the said surfaces of the electrodes. Imperfect electrical contact may be due to the presence of particles of foreign material on the blank and/or the electrodes or to irregularities or roughness in the contacting surfaces of either, and when it has once produced an area of irregularity or roughness in an electrode surface, another imperfect contact is made each time this area is thereafter brought into engagement with the blank so that the roughness of the area not only progressively increases but progressively enlarges as well. Consequently once any appreciable burning and/or pitting has occurred it is substantially impossible to prevent rapid deterioration of the work-contacting surface of the electrode during its further use and in a relatively short time it becomes unsuitable for satisfactory welding.

Furthermore pitting and roughness in the electrode surface may initially be caused by small globules of the metal being thrown out at the seam during the welding operation and adhering to the electrode surface upon coming into contact with it, and if such adherent particles are allowed to remain on the electrode until that part to which they are adhering is again brought into contact with the work they tend to force the latter away from the electrode and thus further impair the electrical contact by materially reducing the effective area of the surface contact between the parts while the normal relation between the work and the electrode is thus disturbed.

In accordance with the present invention, however, I provide apparatus adapted for operative combination with a welding machine adjacent the electrodes comprising means for automatically freeing the electrode surfaces from adherent particles of foreign matter such as globules of metal thrown off by the work and which may also be used for dressing or turning off the work-contacting surfaces of the electrodes in order to insure accurate fit between them and the work and to restore them to their initial condition with regard to smoothness when for any reason they have become pitted or otherwise roughened so as to reduce their maximum efficiency of operation.

It is therefore a principal object of the invention to provide mechanism comprising a welding electrode scraping and cutting tool and supporting and controlling means therefor adapted to position the tool with respect to the electrode in such manner as to insure the constant presentation to the work of a smooth electrode surface uncontaminated by roughness, pitting or the presence of foreign particles, and thus insure efficient and satisfactory conduction of the welding current between the electrode and the work.

A further object is the provision of means adapted for association with the electrodes of a pipe welding machine comprising tools substantially conforming to the proper sectional contour of the electrode surfaces and micrometer adjusting and supporting means therefor adapted to maintain the tools in accurately adjusted relation to the electrodes for preserving and/or restoring the desired smoothness and contour of their work-contacting surfaces so as to insure their efficient operation at all times and substantially prolong their useful life.

Other objects, purposes and advantages of the invention will hereinafter more fully appear or will be understood from the following description of one embodiment thereof as illustrated in the accompanying drawing in which:

Fig. 1 is a top plan view of the apparatus in association with a pipe welding machine fragmentarily indicated in dot and dash lines, certain of the mechanism to the right of the center line of the machine being broken away into horizontal section to show internal construction.

Fig. 2 is a front elevation of that portion of the apparatus shown in Fig. 1 lying to the left of said center line.

Fig. 3 is a side elevation of the mechanism shown in Fig. 2, and

Fig. 4 is a composite detail showing in top plan and side elevation one of the electrode dressing tools.

In the several figures like characters are used to designate the same parts.

Welding machines of the type of those for which the said apparatus is particularly adapted usually comprise a pair of electrode brackets B, B' between which are supported a pair of rotatable electrodes E, E' insulated from each other and providing arcuately curved work-contacting surfaces $e$, $e'$ substantially conforming to the curvature of the pipe or other blank to be welded. These several parts may be of any suitable form and are indicated in the drawing in dot and dash lines for the purpose of illustrating the desired positioning relatively thereto of the apparatus of my invention but form no part of the latter.

The said apparatus, however, comprises two main units respectively disposed on opposite sides of the vertical central plane of the electrodes and is substantially symmetrical with respect to said plane, two separate units being employed to permit both electrodes to be operated upon by the tools at the same time without short-circuiting the current they carry. As the units are substantially similar save for the reversal of certain parts as required by their oppositely disposed relation to said plane a description of one of them, for example the left hand unit in Fig. 1, will suffice for both.

Thus as best shown in Fig. 1 the complete apparatus comprises a pair of complementary right and left handed tools 1 respectively disposed on opposite sides of the central plane of the machine adjacent the working faces e, e' of the electrodes E, E' and extending substantially radially thereof. Figs. 1 and 3 show a clearance between the edges of these tools and the adjacent surfaces of the electrodes but it will be understood that when in operation the tools may and usually do engage the said surfaces as will be hereinafter more fully explained, the absence of electrical communication between the tools permitting both to be used at once.

Each tool comprises a rearwardly extending shank 2, by which it is supported in a slide 3 disposed on ways 4 formed in a support 5 attached to the electrode brackets B or B' as the case may be on the opposite sides of the machine. An L-shaped cap 6 is secured to the slide 3 by bolts 7 passing through a spacer 8 and a set screw 9 is threaded in the cap to rigidly clamp the shank in the slide when these several parts forming the tool holder are assembled.

The supports 5 have dowel pins 10 fitting in corresponding holes in the electrode brackets for positioning them with respect thereto and cap screws 11 and 12 maintain these supports rigidly attached to the brackets in the positions determined by the said pins; the fit of the slide 3 in the ways 4 is snugly maintained through a movable gib 14 backed up by set screws 15 fitted with lock nuts 16 whereby the gib may be adjusted to take up wear of the ways and/or slide.

The tool 1 is thus adapted for adjustment substantially radially with respect to the adjacent electrode through movement of the slide 3 in its ways 4, which preferably lie parallel to a radial plane of the electrode, and this adjustment is effected and controlled by mechanism now to be described, including an adjusting screw 20 extending through the support 5, carrying a collar 21, secured to it by a set screw 22, cooperative with a shoulder 23 on the outer end of the screw 20 to prevent longitudinal movement of the latter in the support although permitting it to be readily rotated therein by means of a removable crank 24 fitting the squared screw head. A nut 25 is threaded on the screw shank and is fitted into a recess 26 in the slide 3 so that rotation of the screw moves the nut 25 longitudinally and it, in turn, the slide 3 to carry the tool 1 radially toward or away from the electrode depending on the direction of rotation of the screw.

Adjacent the screw 20 and substantially parallel to it is another somewhat similar screw 20 also extending through support 5, carrying a collar 31, secured by a set screw 32, cooperative with a peripheral boss or enlargement 33 near the outer end of the screw to prevent its longitudinal movement in the support. This screw carries a nut 34 disposed in the path of a projecting toe 35 formed on the slide 3 and which limits movement of the slide and tool 1 toward the electrode as determined by the setting of the nut; of course this setting can be varied by turning the screw 30 by means of the crank 24, the outer extremity of the screw being squared for reception of the crank to facilitate this adjustment. A calibrated dial 36 is formed on the boss 33 and is marked off in equal divisions whereby through cooperation of an index pointer 37 on the support 5 the exact position of the nut 34 may be very accurately determined. A split locking collar 38 secured to the support 5 surrounds the screw 30 adjacent this dial and is provided with a clamping screw 40 by means of which the collar can be constricted about the screw to prevent inadvertent variation of its position once it has been set.

*Operation*

When the tools 1 are to be used solely for scraping globules of weld metal or other foreign matter from the surfaces of the electrodes as they revolve, they are merely brought into close proximity therewith through operation of the screws 20 in both units of the apparatus, the screws 30 being adjusted if necessary to permit this to be done. When the tools are to be used for dressing or trimming off the electrodes, however, they are moved farther in towards the axes of the electrodes, and to insure that the depth of cut taken by both shall be equal so that the new surfaces of the electrodes thereby produced exactly correspond, it is necessary for both tools to be very accurately adjusted at positions such that their cutting edges are at precisely the required distances from said axes.

The calibrated dials 36 on the screws 30 are of particular usefulness in attaining this accuracy of adjustment, since by properly setting them the nuts 34 in both units may be so positioned as to make the inner limits of movement of both tools 1 exactly the same.

This setting may be accomplished in any of several possible ways, as will be apparent to those skilled in the art, one being to equalize the relation of the nuts 34 and dials 36 at the time the tools 1 are assembled in the slides 3. Thus with the nuts engaging the toes on the slides and set fairly well back from the electrodes, and the dials 36 set with their zero marks opposite the pointers 37, the tools 1 may be fitted in the slides 3 with their front edges just touching the surfaces e, e' of the electrodes, or, if preferred, at exactly equal distances therefrom. The set screws 9 are then set up to hold the tools firmly in position, and they may thereafter remain thus assembled in the slides until they need to be removed for grinding, replacement or the like.

Now as the dials were both initially set to zero, it is apparent that the nuts 34 will be at equal distances from the axes of revolution of the electrodes whenever the dials read the same with respect to their pointers 37, with the result that by turning screws 30 both nuts can be very readily and accurately set so as to limit the possible inward travel of the slides and tools to exactly the same extent or to any desired differential therebetween. Therefore after the nuts have been set to the desired positions as indicated by the dials, the tools can be moved inwardly either simultaneously or sequentially by operation of the screws 20 as the electrodes are driven by the work or in any other suitable way so as to remove an amount of metal from the peripheral work-contacting surfaces of the electrodes determined by the setting of nuts 34 with the assurance that the effective diameter of each electrode will exactly correspond with that of the other when the slides have attained the limit of their respective inward movements assuming, of course, both dials have been set to the same reading, or that the desired differential in their diameters will be produced if the dials have been set to different readings.

After the electrodes have been dressed and during subsequent operation of the welding machine the tools may be left in the final position they attained during the dressing, or backed off very slightly therefrom, and they then serve as scrapers to remove projecting foreign bodies and the like from the electrode surfaces but do not cut the electrodes themselves until a new adjustment is made substantially in the manner just described.

The apparatus thus enables the electrodes to be kept in a condition of maximum welding efficiency, or to be restored thereto, with a minimum of effort and without requiring their removal from the welding machine or prolonged interruptions of its normal operation; thus "micrometer" accuracy of their work-contacting faces is insured at all times and their ability to properly perform their intended functions throughout a long period of useful life materially enhanced.

It will be understood, however, that while I have herein described one embodiment of the invention with considerable particularity, I do not desire or intend to limit or confine myself thereto or thereby in any way, as changes and modifications in the form, construction and arrangement of the several elements and instrumentalities employed will readily occur to those skilled in the art and may be made if desired without departing from the spirit and scope of the invention as defined in the appended claims.

Having thus described my invention, I claim and desire to protect by Letters Patent of the United States:

1. In means for scraping and dressing a rotatable welding electrode, a support disposed adjacent the electrode, a slide carried by the support and provided with a recess, an electrode scraping and dressing tool secured to the slide and movable therewith toward and away from the electrode, means for moving the slide comprising a nut engaging in said recess and a screw carried by the support extending through the nut, and means carried by the support adapted to adjustably limit movement of the slide in one direction comprising a second screw and a nut disposed thereon in the path of movement of a portion of the slide when the slide is moved by said slide-moving means.

2. Apparatus of the class described comprising a support providing parallel ways, a slide movable on said ways adapted to support a tool and having a projecting toe and a recess, a nut engaging in the latter, a screw carried by the support extending through the nut and adapted by its rotation to move the nut longitudinally to thereby correspondingly move the slide in the ways, another screw disposed parallel to and adjacent the first screw, a nut thereon projecting into the path of the toe to limit movement with the slide in one direction and means for selectively turning the screws.

3. Apparatus of the class described comprising a support providing parallel ways, a slide movable on said ways adapted to support a tool and having a projecting toe and a recess, a nut engaging in the latter, a screw carried by the support extending through the nut and adapted by its rotation to move the nut longitudinally to thereby correspondingly move the slide in the ways, another screw disposed parallel to and adjacent the first screw, a nut thereon projecting into the path of the toe to limit movement of the slide in one direction, a calibrated dial carried by the second screw, an indexing pointer extending into the vicinity of the dial, and means for locking said screw and dial against rotation relatively to the support.

4. Apparatus of the class described comprising a support providing parallel ways, a slide movable on said ways adapted to support a tool and having a projecting toe and a recess, a nut engaging in the latter, a screw carried by the support extending through the nut and adapted by its rotation to move the nut longitudinally to thereby correspondingly move the slide in the ways, another screw disposed parallel to and adjacent the first screw, a nut thereon projecting into the path of the toe to limit movement with the slide in one direction, means adapted to restrain longitudinal movement of the screws in the support and means for rotating the screws to thereby selectively move the nuts longitudinally thereof.

5. In means for scraping and dressing a pair of axially spaced rotatable welding electrodes each having a work-engaging peripheral surface, a pair of complementary tools each having a cutting edge substantially conforming to one of said surfaces, and means for supporting each tool with its said edge adjacent such surface comprising a support secured to the frame of the machine, a tool holding slide movable on said support toward and away from the electrode, a screw for effecting such movement, a second screw paralleling the first screw and non-axially movable in the support, a nut on the second screw movable axially of the latter by rotation of the screw, and a toe carried by the slide and cooperating with the nut to limit the movement of the slide and tool toward the electrode in accordance with the adjusted position of the nut.

6. In means for scraping and dressing a pair of axially spaced rotatable welding electrodes each having a work-engaging peripheral surface, a pair of complementary tools each having a cutting edge substantially conforming to one of said surfaces, and means for supporting each tool with its said edge adjacent such surface comprising a support secured to the frame of the machine, a tool holding slide movable on said support toward and away from the electrode, a screw for effecting such movement, a second screw paralleling the first screw and non-axially movable in the support, a nut on the second screw movable axially of the latter by rotation of the screw, a calibrated dial on said screw adjacent its outer end, a fixed pointer cooperative therewith to facilitate determination of the adjusted position of the nut, and a toe carried by the slide and cooperating with the nut to limit the movement of the slide and tool toward the electrode in accordance with the adjusted position of the nut.

EARNEST W. MISHLER.